United States Patent [19]

Schäfer et al.

[11] Patent Number: 5,292,807

[45] Date of Patent: Mar. 8, 1994

[54] COMPOSITIONS OF CYCLIC ISOUREA COMPONENT WITH CARBOXYL COMPONENT

[75] Inventors: Walter Schäfer, Leichlingen; Hanns P. Müller, Odenthal-Höffe; Hans-Joachim Kreuder, Toenisvorst; Manfred Bock, Leverkusen; Knud Reuter, Krefeld, all of Fed. Rep. of Germany

[73] Assignee: Bayer Aktiengesellschaft, Leverkusen, Fed. Rep. of Germany

[21] Appl. No.: 9,516

[22] Filed: Jan. 27, 1993

[30] Foreign Application Priority Data

Feb. 4, 1992 [DE] Fed. Rep. of Germany ....... 4203085

[51] Int. Cl.⁵ .................... C08G 12/32; C08G 18/38; C08G 59/14; C08L 33/08
[52] U.S. Cl. .................... 525/113; 525/127; 525/128; 525/131; 525/162; 525/163; 525/437; 525/438; 525/440; 525/443; 525/447; 525/452; 525/454; 525/501.5; 525/504; 525/519; 525/533; 528/44; 528/59; 528/117; 528/335
[58] Field of Search ............... 525/113, 127, 128, 131, 525/163, 437, 438, 440, 443, 447, 452, 454, 504, 519, 533, 162; 528/68, 117, 44, 59, 335; 548/233

[56] References Cited

U.S. PATENT DOCUMENTS

| | | | |
|---|---|---|---|
| 3,689,499 | 9/1972 | Metzger, Jr. .................... | 548/233 |
| 4,069,198 | 1/1978 | Ibbotson .................... | 564/51 |
| 4,262,112 | 4/1981 | Mark .................... | 528/126 |
| 4,410,689 | 10/1983 | Barsa et al. .................... | 528/45 |
| 4,652,620 | 3/1987 | Tufts et al. .................... | 528/117 |
| 4,996,281 | 2/1991 | So .................... | 528/73 |
| 5,196,531 | 3/1993 | Umetani et al. .................... | 548/233 |

FOREIGN PATENT DOCUMENTS

0351814 1/1990 European Pat. Off. ............ 548/233
3-157421 7/1991 Japan .

OTHER PUBLICATIONS

Chem. Ber. 100 1967, pp. 16 to 22.
Chem. Rev. 71 483 (1971).
Liebigs Ann. Chem. 442, 130.
Database WPI AN 85342 & JP-A-4 028 779 (Dainippon Ink) Jan. 31, 1992 (Abstract).
Patents Abstracts of Japan, Oct. 2, 1991 & JP-31 57 421 (Teijin) Jul. 5, 1991.

*Primary Examiner*—Robert E. Sellers
*Attorney, Agent, or Firm*—Joseph C. Gil; Thomas W. Roy

[57] ABSTRACT

The present invention relates to compositions which are storage stable at room temperature and contain
A) at least one compound having at least two cyclic isourea groups per molecule and
B) at least one compound having at least two carboxyl groups per molecule,
in an amount sufficient to provide a molar ratio of isourea groups to carboxyl groups of 0.5:1 to 1.5:1.

4 Claims, No Drawings

COMPOSITIONS OF CYCLIC ISOUREA COMPONENT WITH CARBOXYL COMPONENT

BACKGROUND OF THE INVENTION

1. Field of the Invention

The invention relates to new compositions containing compounds having cyclic isourea groups in combination with organic polycarboxylic acids.

2. Description of the Prior Art

One-container, two-component systems are known. These are understood to include lacquer binders consisting of two individual components which only react with one another, in a crosslinking reaction, at elevated temperature and can therefore be combined and stored in one container at room temperature. The best-known coating compositions of this type include combinations of organic polyhydroxyl compounds with blocked polyisocyanates. The disadvantage of these systems is that, when the coating is stoved, the blocking agent is reformed and released into the environment.

The present invention provides novel one container, two-component coatings binders which are storable at room temperature and crosslinkable at elevated temperature without cleavage of the blocking agents. The individual components of the binders are selected from cyclic isoureas and polycarboxylic acids which are described in greater detail hereinafter.

It could not be anticipated that the mixtures according to the invention would be storage stable at room temperature, since it has previously been described in the literature that the reaction of isoureas with carboxylic acids takes place at room temperature (Chem. Ber. 100, (1967), pages 16 to 22).

Although Japanese patent application, publication number JA 91/157 421 has previously described heat-curable compositions containing cyclic isoureas, these are ternary mixtures which, in addition to the isoureas, contain polyepoxides and also H-active compounds such as carboxylic acids or isocyanates.

SUMMARY OF THE INVENTION

The present invention relates to compositions which are storage stable at room temperature and contain
A) at least one compound having at least two cyclic isourea groups per molecule and
B) at least one compound having at least two carboxyl groups per molecule, in an amount sufficient to provide a molar ratio of isourea groups to carboxyl groups of 0.5:1 to 1.5:1.

DETAILED DESCRIPTION OF THE INVENTION

Component A) of the compositions according to the invention is an organic compound having at least 2, preferably 2 to 4 cyclic isourea groups per molecule. The isourea equivalent weight (i.e., the molecular weight per cyclic isourea structural unit) is preferably 338 to 2000. The cyclic isourea structural units correspond to the formulas

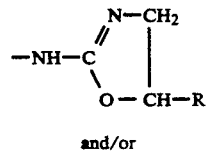

and/or

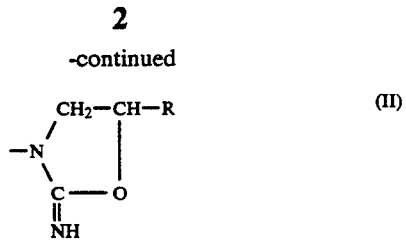

wherein
R is hydrogen, an alkyl radical having 1 to 18, preferably 1 to 4 carbon atoms, or a phenyl, chloromethyl or phenoxymethyl radical.

Compounds A) may be prepared by reacting cyclic isourea derivatives of the formula

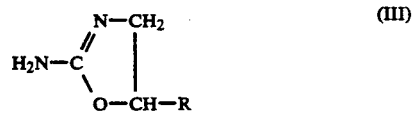

with polyfunctional compounds having groups which are functional towards amino groups in an addition reaction or a condensation reaction.

The heterocyclic amines of formula (III) are known (Chem. Rev. 71, 483 (1971); Liebigs Ann. Chem. 442, 130) and can be obtained from cyanamide and epoxides of the formula

This reaction is generally carried out at a temperature of −10° C. to 25° C. in an aqueous medium, preferably using excess cyanamide.

Examples of suitable compounds having an amino group and corresponding to formula (III) include 2-amino-4,5-dihydrooxazole, 2-amino-5-methyl-4,5-dihydrooxazole, 2-amino-5-ethyl-4,5-dihydrooxazole, 2-amino-5-octyl-4,5-dihydrooxazole, 2-amino-5-stearyl-4,5-dihydrooxazole, 2-amino-5-phenyl-4,5-dihydrooxazole, 2-amino-5-chloromethyl-4,5-dihydrooxazole or 2-amino-5-phenoxymethyl-4,5-dihydrooxazole.

Reactants for the heterocyclic amines of formula (III) to prepare starting components A) include 1. organic polyisocyanates, which are preferably reacted with the compounds of formula (III) while maintaining an NCO/NH$_2$ equivalent ratio of 0.8:1 to 1.2:1;
2. organic polyepoxides, which are preferably reacted with the heterocyclic amines while maintaining an equivalent ratio of epoxy groups to primary amino groups of 0.8:1 to 1.2:1;
3. melamine/formaldehyde or urea/formaldehyde resins having methylol or methoxymethyl groups, which are preferably reacted with the heterocyclic amines while maintaining a molar ratio of methylol and methoxymethyl groups to primary amino groups of 0.8:1 to 1.2:1; and
4. compounds having carboxylic acid ester groups, which are preferably reacted with the heterocyclic amines while maintaining an equivalent ratio of ester groups to primary amino groups of 0.8:1 to 1.2:1.

Suitable polyisocyanates are the selected from the aliphatic, cycloaliphatic or araliphatic diisocyanates which are known from polyurethane chemistry. Examples include tetramethylene 1,4-diisocyanate, pentamethylene 1,5-diisocyanate, hexamethylene 1,6-diisocyanate, 2,2,4- and 2,4,4-trimethyl-1,6-diisocyanatohexane, undecamethylene 1,11-diisocyanate, dodecamethylene 1,12-diisocyanate, 1,2-diisocyanatomethylcyclobutene, 1,4-diisocyanatocyclohexane, dicyclohexyl diisocyanate, 4,4'-diisocyanatodicyclohexylmethane, p- and m-xylylene diisocyanate, 1-methyl-2,4-diisocyanatocyclohexane, 1-methyl-2,6-diisocyanatocyclohexane and 1-isocyanato-3,3, 5-trimethyl-5-isocyanatomethylcyclohexane.

Particularly suitable polyisocyanates are 1-isocyanato-3,3,5-trimethyl-5-isocyanatomethylcyclohexane, cyclohexane 1,4-diisocyanate, 4,4'-diisocyanatodicyclohexylmethane, an 80:20 mixture of 2,4- and 2,6-diisocyanato-1-meth cyclohexane, hexamethylene diisocyanate, 2,2,4- and 2,4,4-trimethylhexamethylene diisocyanate; and polyisocyanates prepared from hexamethylene diisocyanate and/or 1-isocyanato-3,3,5-trimethyl-5-isocyanatomethylcyclohexane and containing oxadiazinetrione groups, uretdione groups, bioret groups and/or isocyanurate groups. Mixtures of the preceding di- and/or polyisocyanates may also be used.

Other polyisocyanates which are suitable, although less preferred, include aromatic polyisocyanates such as 2,4- and/or 2,6-diisocyanatotoluene, 2,4'- and/or 4,4'-diisocyanatodiphenylmethane and mixtures of such diisocyanates. Also suitable, though less preferred, are prepolymers having NCO groups which are prepared from the previously described organic polyisocyanates and subequivalent amounts of organic polyhydroxyl compounds, provided that the resulting compounds A) possess the required isourea equivalent weight.

Suitable polyepoxides are selected from organic compounds having at least two epoxy groups per molecule, provided that the reaction products of the polyepoxides with the heterocyclic amines of formula (III) possess the required isourea equivalent weight.

Examples of suitable polyepoxides are polyglycidyl and poly($\beta$-methylglycidyl) esters obtained by reacting compounds having two or more carboxylic acid groups per molecule with epichlorohydrin, glycerol dichlorohydrin or $\beta$-methylepichlorohydrin in the presence of alkali. These polyglycidyl esters may be prepared from aliphatic polycarboxylic acids such as oxalic acid, succinic acid, glutaric acid, adipic acid, pimelic acid, suberic acid, azelaic acid, sebacic acid and dimerized or trimerized linoleic acid; cycloaliphatic polycarboxylic acids such as tetrahydrophthalic acid, 4-methyltetrahydrophthalic acid, hexahydrophthalic acid and 4-methylhexahydrophthalic acid; and aromatic polycarboxylic acids such as phthalic acid, isophthalic acid and terephthalic acid.

Also suitable are polyglycidyl and poly($\beta$-methylglycidyl) ethers obtained by the reaction of compounds having at least two free alcoholic hydroxyl groups and/or phenolic hydroxyl groups per molecule with suitable epichlorohydrins under alkaline conditions or in the presence of acid catalysts, followed by treatment with alkali. Such ethers can be derived from acyclic alcohols such as ethylene glycol, diethylene glycol and higher MW poly(oxyethylene) glycols, propane-1,2-diol and poly(oxypropylene) glycols, propane-1,3-diol, butane-1,4-diol, poly(oxytetramethylene) glycols, pentane 1,5-diol, hexane-1,6-diol, hexane-2,4,6-triol, glycerol, 1,1,1-trimethylolpropane, pentaerythritol and sorbitol; cycloaliphatic alcohols such as cyclohexane-1,3- and 1,4-diol, bis(4-hydroxycyclohexyl)-methane, 2,2-bis(4-hydroxycyclohexyl)-propane and 1,1-bis(hydroxymethyl)-cyclohex-3-ene; and alcohols with aromatic rings such as N,N-bis(2-hydroxyethyl)-aniline and p,p'-bis(2-hydroxymethylamino)-diphenylmethane.

The polyglycidyl and poly($\beta$-methylglycidyl) ethers can also be derived from mononuclear phenols such as resorcinol and hydroquinone; polynuclear phenols such as bis(4-hydroxyphenyl)-methane, 4,4'-dihydroxybiphenyl, bis(4-hydroxyphenyl)-sulphone, 1,1,2,2-tetrakis(4-hydroxyphenyl)-ethane, 2,2-bis(4-hydroxy-phenyl)-propane and 2,2-bis(3,5-dibromo-4-hydroxyphenyl)-propane; and novolaks prepared from aldehydes (such as formaldehyde, acetaldehyde, chloral and furfurylaldehyde) and phenols (e.g., unsubstituted phenol and phenols which are ring-substituted by chlorine atoms or alkyl groups having up to 9 carbon atoms such as 4-chlorophenol, 2-methylphenol and 4-tert-butylphenol.

Further examples of polyepoxides are compounds obtained by dehydrochlorination of the reaction products of epichlorohydrin and amines having at least two amine hydrogen atoms such as aniline, n-butylamine, bis(4-aminophenyl)-methane, m-xylylenediamine and bis(4-methylaminophenyl)-methane; triglycidyl isocyanurate; N,N'-diglycidyl derivatives of cyclic alkyleneureas such as ethyleneurea and 1,3-propyleneurea; and hydantoins such as 5,5-dimethylhydantoin.

Preferred epoxy resins are polyglycidyl ethers, polyglycidyl esters, N,N'-diglycidylhydantoins and poly(N-glycidyl) derivatives of aromatic amines. Particularly preferred resins are polyglycidyl ethers of 2,2-bis(4-hydroxyphenyl)-propane or bis(4-hydroxyphenyl)-methane, and polyglycidyl ethers derived from novolaks prepared from formaldehyde and phenols with a 1,2-epoxy content of at least 0.5 equivalent/kg.

Suitable melamine/formaldehyde or urea/formaldehyde resins are selected from condensation products of melamine or urea with formaldehyde which have at least two methylol and/or methoxymethyl groups per molecule, provided that the resulting reaction products with the heterocyclic amines of formula (III) possess the required isourea equivalent weight.

Suitable compounds having carboxylic acid ester groups are selected from organic compounds which have at least two carboxylic acid ester groups per molecule and are based on readily volatile aliphatic alcohols, provided that the resulting reaction products with the heterocyclic amines of formula (III) possess the required isourea equivalent weight. Examples include dimethyl oxalate, dimethyl succinate, dimethyl fumarate, dimeric fatty acid dimethyl esters, dimethyl terephthalate, dimethyl isophthalate, methyl acrylate, methyl methacrylate, $\epsilon$-caprolactone and $\gamma$-butyrolactone.

The content of isourea groups in the reaction products can be determined by titration with 1 N HCl in DMF as solvent (bromophenol blue indicator).

The reaction of the heterocyclic amines of formula (III) with the previously described reactants capable of addition or condensation reactions is carried out in known manner, if appropriate in the presence of conventional catalysts which accelerate the addition or condensation reactions.

Component B) of the compositions according to the invention is selected from organic compounds having a molecular weight of 145 to 20,000, at least two carboxyl groups per molecule and an acid number of at least 28 mg KOH/G.

Compounds which are particularly suitable as component B) are copolymers having carboxyl groups and prepared by the copolymerization of olefinically unsaturated carboxylic acids (for example acrylic acid, methacrylic acid, fumaric acid and/or maleic acid) with other olefinically unsaturated monomers. Examples of these other olefinically unsaturated monomers include alkyl acrylates or methacrylates having 1 to 10 carbon atoms in the alkyl radical, such as methyl, ethyl, n-propyl, the isomeric propyl, the isomeric butyl, the isomeric octyl or the isomeric hexyl acrylates or methacrylates; styrene; acrylonitrile; hydroxyalkyl acrylates or methacrylates having 2 to 4 carbon atoms in the alkyl radical; and mixtures of these monomers.

The copolymers preferably have a molecular weight ($M_n$, as determined by gel permeation chromatography) of 2000 to 15,000, and an acid number of 70 to 160 mg KOH/G.

Examples of other compounds which are suitable as component B) are reaction products of intramolecular carboxylic anhydrides, such as maleic anhydride or phthalic anhydride, with organic polyhydroxyl compounds in the sense of a ring-opening ester formation reaction, provided that the resulting reaction products correspond to the details given in respect of the carboxyl group content and the carboxyl functionality.

Examples of other compounds which are suitable as component B) include monomeric polycarboxylic acids such as adipic acid, sebacic acid, phthalic acid, hexahydrophthalic acid, dimeric or trimeric fatty acids and mixtures of any of the previously mentioned polycarboxylic acids.

In the compositions according to the invention, components A) and B) are present in amounts sufficient to provide 0.5 to 1.5, preferably 0.8 to 1.2, carboxyl groups per isourea group.

The mixtures are suitable as heat-curable binders for solvent-containing coating compositions or for powder coating compositions, provided that the powders are solid at 30° C. and liquid above 120° C.

Powder coating compositions based on the compositions according to the invention can be prepared for example by a procedure in which the individual components are blended together, converted briefly to the liquid state by heating without undergoing significant crosslinking reaction, intimately mixed as a liquid and then cooled, after which the intimate mixture is pulverized to provide the binder for the powder coating compositions.

Examples of suitable solvents for the preparation of the solvent-containing coating compositions are toluene, xylene, methanol, ethanol, isopropanol, the isomeric butanols, ethyl acetate, butyl acetate, methoxypropyl acetate, tetrahydrofuran, dimethylformamide, N-methylpyrrolidone and mixtures of these solvents.

If desired, suitable catalysts can also be added to the coating compositions to accelerate the crosslinking reaction between the carboxyl groups and isourea groups. These catalysts include organic tin, zinc or copper compounds, preferably methyl p-toluenesulphonate or p-toluenesulphonic acid.

The auxiliaries and additives conventionally used in coatings technology, for example, pigments, flow control agents, light stabilizers, etc., can be incorporated into the compositions according to the invention or the coating compositions prepared therefrom.

The coating compositions according to the invention are generally applied by methods conventionally used in coatings technology, in amounts sufficient to provide a dry film thickness of 5 to 200 μm. Suitable substrates include heat-resistant substrates such as metals, heat-resistant plastics and mineral substrates such as stone, concrete or glass.

The powder coating compositions according to the invention can be applied by the electrostatic powder coating process (EPC process).

The coating compositions are generally cured at a temperature of 120° to 200° C., preferably 140° to 180° C.

In the following examples, all parts and percentages are by weight unless otherwise indicated.

Examples 1 to 7 are directed to the preparation of compounds which are suitable as component A).

Example 1

632.6 g (3.3 moles of NCO) of trimerized hexamethylene diisocyanate were added dropwise, under nitrogen, to 331 g (3.3 moles) of 2-amino-5-methyl-4,5-dihydrooxazole and the temperature was controlled so that is did not exceed 70° C. After the reaction mixture had been stirred for 0.5 hour at 70° C., the temperature was raised to 1200° C. and the mixture was kept under vacuum for 3 hours. A brittle product was formed which had a melting point of 70° to 80° C. and an equivalent weight of 339 g per mole of isourea groups.

Example 2

84 g (0.5 moles) of hexamethylene diisocyanate were added dropwise to a solution of 100 g (1.0 mole) of 2-amino-5-ethyl-4,5-dihydrooxazole in 250 ml of toluene and the temperature was controlled so that it did not exceed 35° C. The reaction solution was then stirred for a further one hour at 70° C. and the toluene was subsequently removed at 12 mbar/50° C. A product having a melting point of 130° C. crystallized out. As determined by titration, the product had an equivalent weight of 198 g per mole of isourea groups.

Example 3

262 g (1 mole) of 4,4-diisocyanatodicyclohexylmethane were added dropwise to a solution of 200 g (2 moles) of 2-amino-5-methyl-4,5-dihydrooxazole in 500 ml of xylene and the temperature was controlled so that is did not exceed 70° C. After the reaction mixture had been stirred for one hour, it was heated at 120° C. for 3 hours; 2 phases were formed. After concentration at 120° C. and 1 to 2 mbar, a brittle product having a melting point of 170° C. was obtained. The equivalent weight was 230 g per mole of isourea groups.

Example 4

280 g (1.1 moles of NCO) of a trimer prepared from isophorone diisocyanate and dissolved in 33 g of Solvesso solvent were added dropwise with ice-water cooling to 100 g (1.0 mole) of 2-amino-5-methyl-4,5-dihydrooxazole. The mixture was then stirred for 0.5 hour at 70° C. After distillation of the solvent at 90° to 120° C. and a pressure of 0.5 to 1 mbar, a brittle product was obtained which had a melting point of 130° to 150° C. and an equivalent weight of 610 g per mole of isourea groups.

Example 5

200 g (2.0 moles) of 2-amino-5-methyl-4,5-dihydrooxazole were added to a solution of 180 g of a diglycidyl ether of bisphenol A (epoxide equivalent weight=180) in 500 ml of xylene and the mixture was heated to 120° to 130° C. over one hour. After stirring for one hour, the supernatant xylene phase was decanted off and the residual xylene in the lower phase was then removed at 100° to 120° C. and 1 to 2 mbar. A very viscous resin was obtained which had an equivalent weight of 295 g per mole of isourea groups.

Example 6

100 g (1.0 mole) of 2-amino-5-methyl-4,5-dihydrooxazole were added to 72 g (1.0 mole of methoxymethyl groups) of a melamine/formaldehyde resin and the mixture was heated at 125° C. for 0.5 hour in the presence of one ml of formic acid. A colorless, viscous resin was obtained which had an equivalent weight of 221 g per mole of isourea groups.

Example 7

300 g (3.0 moles) of 2-amino-5-methyl-4,5-dihydrooxazole were mixed with 343 g (3.0 moles) of ε-caprolactone at room temperature and then heated at 120° C. for one hour.

250 g (1.1 mole of OH groups) of this adduct in 250 ml of dimethylformamide were added dropwise to 150 g (1.1 moles of NCO groups) of 4,4'-diisocyanatodicyclohexylmethane at 70° C. The temperature was raised to 110° C. and the reaction mixture was stirred until an NCO band was no longer visible in the IR spectrum.

Coating 1

10 g of the isourea of Example 1, dissolved in 23 g of methoxyethanol, were added to 40 g of a carboxyl group-containing copolymer dissolved in 25 g of n-butyl acetate. The copolymer had an acid number of 85.7 mg KOH/G and was prepared from 48% methyl methacrylate, 41% 2-ethylhexyl acrylate and 11% acrylic acid. The mixture was storage stable and provided a glossy, acetone-resistant film when blade-coated on to a glass plate and stoved at 155° C./30 min. After 2 weeks the mixture again provided a glossy, acetone-resistant film when blade-coated on to a glass plate and stoved at 155° C./30 min.

Coating 2

14 g of the isourea of Example 5, dissolved in 14 g of lo methoxyethanol, were added to 30 g of the copolymer described in Coating 1, dissolved in 20 g of butyl acetate. The mixture was storage stable and provided a glossy, acetone-resistant film when blade-coated on to a glass plate and stoved at 155° C./30 min. After 2 weeks the mixture again provided a glossy, acetone-resistant film when blade-coated on to a glass plate and stoved at 155° C./30 min.

Coating 3

23 g of the isourea of Example 3, dissolved in 100 g of a 1:3 mixture of methoxyethanol and dimethylformamide, were added to 45 g of a carboxyl group-containing copolymer. The copolymer had an acid number of 123.9 KOH/G and was prepared from 17% methyl methacrylate, 64% n-butyl acrylate and 19% methacrylic acid. The mixture was heated to 120° C. and, after cooling to room temperature, was blade-coated on to a glass plate. After stoving at 155° C./30 min, a slightly matt, acetone-resistant film was obtained.

Coating 4

59 g of the isourea solution of Example 7 were added to 45 g of the copolymer described in Coating 3, dissolved in 50 g of dimethylformamide. The mixture was storage stable and provided a glossy, acetone-resistant film when blade-coated on to a glass plate and stoved at 155° C./30 min.

Coating 5

10 g of the isourea of Example 6, dissolved in 10 g of methoxyethanol, were added to 22 g of the copolymer described in Coating 3, dissolved in 25 g of dimethylformamide. The mixture was storage stable and provided a glossy, acetone-resistant film when blade-coated on to a glass plate and stoved at 155° C./30 min.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is storage stable at room temperature and comprises
A) at least one compound having at least two cyclic isourea groups per molecule and
B) at least one compound having at least two carboxyl groups per molecule which is selected from copolymers having an acid number of at least 28 mg KOH/g and prepared by the copolymerization of olefinically unsaturated carboxylic acids with other olefinically unsaturated monomers, in an amount sufficient to provide a molar ratio of isourea groups to carboxyl groups of 0.5:1 to 1.5:1.

2. The composition of claim 1 wherein the cyclic isourea groups correspond to formulas

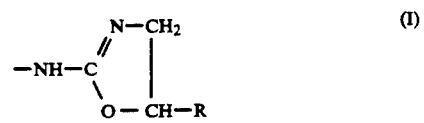

and/or

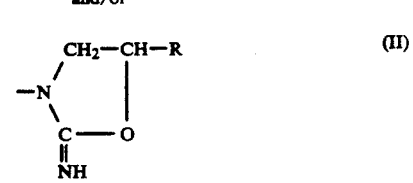

wherein
R represents hydrogen, an alkyl radical having 1 to 18 carbon atoms, or a phenyl, chloromethyl or phenoxymethyl radical.

3. A composition which is storage stable at room temperature and comprises
A) at least one compound having at least two cyclic isourea groups per molecule which is the reaction product of
i) a cyclic isourea corresponding to the formula

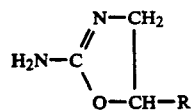

wherein R represents hydrogen, an alkyl radical having 1 to 18 carbon atoms, or a phenyl, chloromethyl or phenoxymethyl radical with ii) a member selected from the group consisting of organic polyisocyanates, organic polyepoxides, methylol or methoxymethyl groups-containing melamine/formaldehyde and urea/formaldehyde resins and compounds having carboxylic acid ester groups and B) at least one compound having at least two carboxyl groups per molecule, in an amount sufficient to provide a molar ratio of isourea groups to carboxyl groups of 0.5:1 to 1.5:1.

4. The composition of claim 3 wherein component B) comprises a copolymer having an acid number of at least 28 mg KOH/g and prepared by the copolymerization of olefinically unsaturated carboxylic acids with other olefinically unsaturated monomers.

* * * * *